United States Patent
Nitta

(10) Patent No.: US 11,539,855 B2
(45) Date of Patent: Dec. 27, 2022

(54) IMAGE FORMING APPARATUS

(71) Applicant: KYOCERA Document Solutions Inc., Osaka (JP)

(72) Inventor: Ryuichi Nitta, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/680,713

(22) Filed: Feb. 25, 2022

(65) Prior Publication Data

US 2022/0279086 A1 Sep. 1, 2022

(30) Foreign Application Priority Data

Feb. 26, 2021 (JP) .............................. JP2021-030314

(51) Int. Cl.
*G06F 15/00* (2006.01)
*H04N 1/32* (2006.01)
*H04N 1/00* (2006.01)

(52) U.S. Cl.
CPC ....... *H04N 1/32133* (2013.01); *H04N 1/0044* (2013.01); *H04N 1/00411* (2013.01); *H04N 2201/3226* (2013.01); *H04N 2201/3269* (2013.01)

(58) Field of Classification Search
CPC ........... H04N 1/32133; H04N 1/00411; H04N 1/0044; H04N 2201/3226; H04N 2201/3269
USPC ....................................................... 358/1.15
See application file for complete search history.

(56) References Cited

U.S. PATENT DOCUMENTS

| 8,576,420 | B2 | 11/2013 | Akahori | |
| 2007/0019222 | A1* | 1/2007 | Oda | G06F 3/1245 358/1.13 |
| 2007/0247652 | A1 | 10/2007 | Akahori | |
| 2012/0314242 | A1* | 12/2012 | Kakutani | H04N 1/00867 358/1.14 |
| 2018/0278795 | A1* | 9/2018 | Zhang | H04N 1/00331 |

FOREIGN PATENT DOCUMENTS

JP 2007-288691 A 11/2007

* cited by examiner

*Primary Examiner* — Mark R Milia
(74) *Attorney, Agent, or Firm* — Studebaker & Brackett PC

(57) ABSTRACT

An image forming apparatus includes an image forming section, an operation section, storage, and a controller. The image forming section forms a document image on a recording medium. The operation section includes a touch panel. The storage stores image data therein. The controller: converts document image data to two-dimensional barcode image data; randomly determines a position and an orientation of a two-dimensional barcode image to be located in a document image; stores to the storage the two-dimensional barcode image data together with information on the position and the orientation that are determined by the controller; and causes, only when a correct answer about the information on the position and the orientation is received from a user through the touch panel, preview display of the document image through converting the two-dimensional barcode image data back to the document image data.

4 Claims, 5 Drawing Sheets

IMAGE FORMING APPARATUS

INCORPORATION BY REFERENCE

The present application claims priority under 35 U.S.C. § 119 to Japanese Patent Application No. 2021-030314, filed on Feb. 26, 2021. The contents of this application are incorporated herein by reference in their entirety.

BACKGROUND

The present disclosure relates to an image forming apparatus.

An image processing device executes copying only when a user setting relating to image copying fulfils an acceptance condition embedded in a read document image.

SUMMARY

An image forming apparatus according to an aspect of the present disclosure includes an image forming section, an operation section, storage, and a controller. The image forming section forms an image on a recording medium. The operation section includes a touch panel. The storage stores image data therein. The controller controls the image forming section, the operation section, and the storage. The controller: converts document image data to two-dimensional barcode image data; randomly determines a position and an orientation of a two-dimensional barcode image to be located in a document image; stores to the storage the two-dimensional barcode image data together with information on the position and the orientation that are determined by the controller, and causes, only when a correct answer about the information on the position and the orientation is received from a user through the touch panel, preview display of the document image through converting the two-dimensional barcode image data back to the document image data.

DETAILED DESCRIPTION

Figure 1:
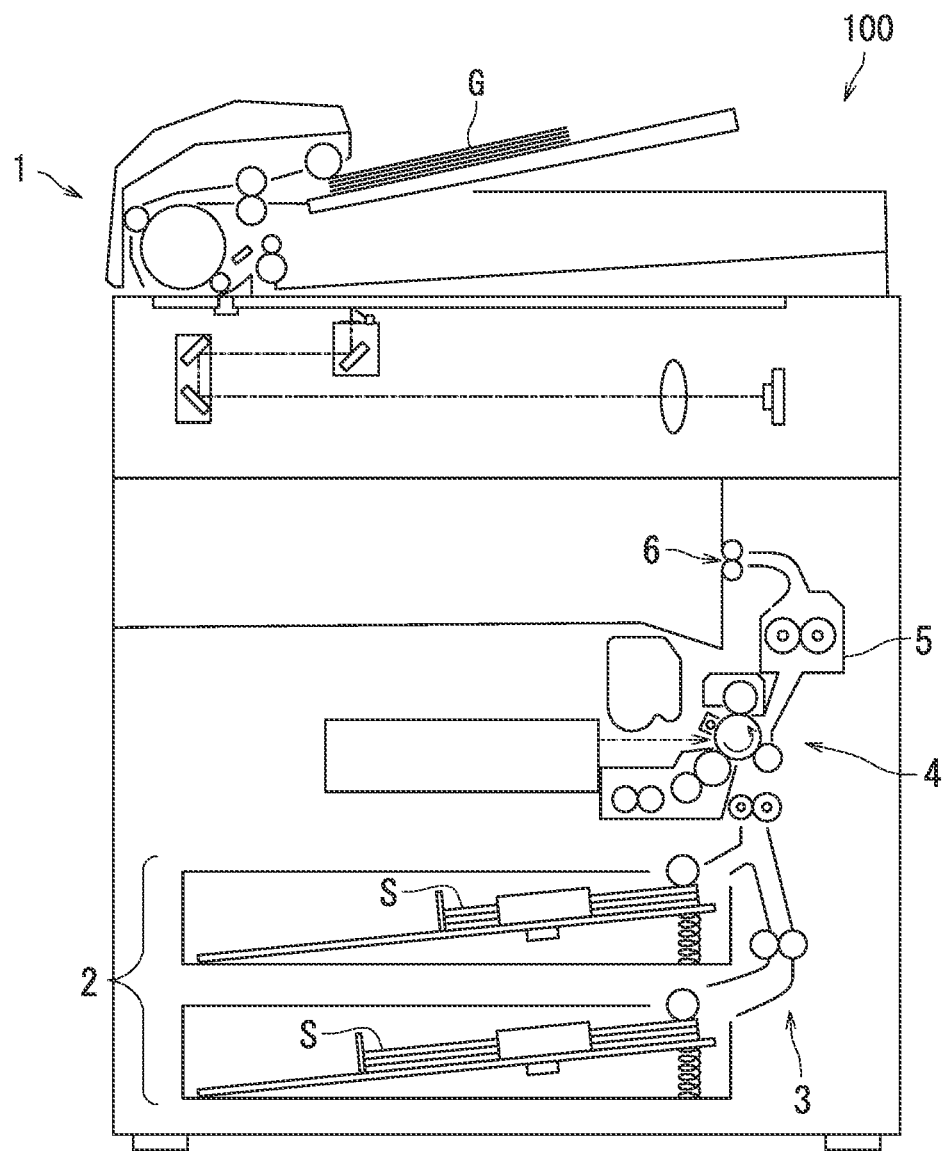
FIG. 1 is a schematic diagram illustrating an example of a configuration of an image forming apparatus according to an embodiment.

The following describes an embodiment of the present disclosure with reference to the accompanying drawings. Note that elements that are the same or equivalent are marked by the same reference signs in the drawings and description thereof is not repeated.

An image forming apparatus 100 according to an embodiment will be described with reference to FIG. 1. FIG. 1 is a schematic diagram illustrating an example of a configuration of the image forming apparatus 100. The image forming apparatus 100 is a copier, a printer, a facsimile machine, or a multifunction peripheral having functions of these, for example. In the following, an embodiment will be described in which the image forming apparatus 100 is a monochrome multifunction peripheral.

As illustrated in FIG. 1, the image forming apparatus 100 includes a reading section 1, a feeding section 2, a conveyance section 3, an image forming section 4, a fixing section 5, and an ejection section 6.

The reading section 1 reads an image of a document G The reading section 1 generates image data from a read image. The feeding section 2 accommodates a plurality of sheets S and feeds the sheets S to the conveyance section 3 one at a time. The sheets S are made of paper or synthetic resin, for example. The conveyance section 3 includes a plurality of conveyance roller pairs and conveys each sheet S to the image forming section 4. The sheet S corresponds to an example of a "recording medium".

The image forming section 4 electrographically forms a toner image on the sheet S. The image forming section 4 includes a photosensitive drum, a charger, a light exposure device, a development device, a replenishment device, a transfer device, a cleaner, and a static eliminator. The toner image exhibits the image of the document G for example. The fixing section 5 applies heat and pressure to the toner image to fix the toner image to the sheet S. The conveyance section 3 conveys the sheet S with the toner image fixed thereto to the ejection section 6. The ejection section 6 ejects the sheet S out of the image forming apparatus 100.

Figure 2:
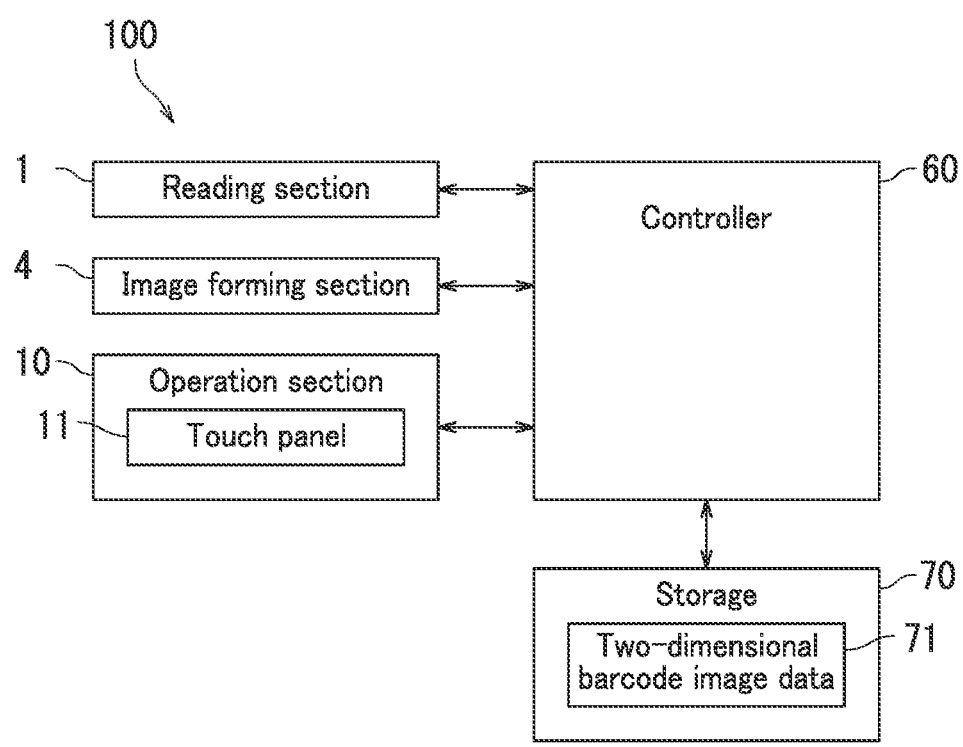
FIG. 2 is a block diagram of an example of a circuit configuration of the image forming apparatus.

A circuit configuration of the image forming apparatus 100 will be descried next with reference to FIGS. 1 and 2. FIG. 2 is a schematic diagram illustrating an example of the circuit configuration of the image forming apparatus 100.

As illustrated in FIG. 2, the image forming apparatus 100 further includes an operation section 10, a controller 60, and storage 70.

The operation section 10 is an input device for receiving various user operations. The operation section 10 includes a touch panel 11. The operation section 10 may further include an operation button. Information indicating a user operation is transmitted to the controller 60.

The storage 70 includes a storage device and stores data and computer programs therein. The storage 70 includes a main storage device such as semiconductor memory, and an auxiliary storage device such as a hard disk drive.

The controller 60 includes a processor such as a central processing unit (CPU), and executes the computer programs stored in the storage 70 to control each element of the image forming apparatus 100.

The controller 60 converts document image data generated by the reading section 1 to two-dimensional barcode image data 71, randomly determines a position and an orientation of a two-dimensional barcode image to be located in a document image, and stores to the storage 70 the two-dimensional barcode image data 71 together with information on the position and the orientation that are determined.

Figure 3:
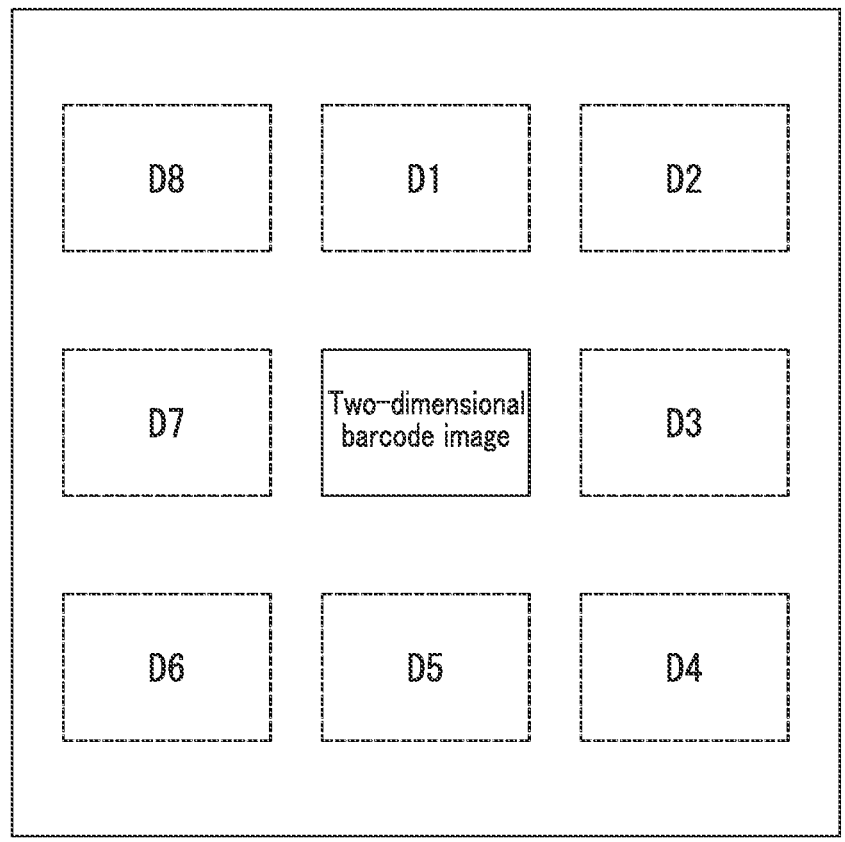
FIG. 3 is a diagram illustrating an example of a screen that presents to a user a position and an orientation of a two-dimensional barcode image that are determined by a controller.

The two-dimensional barcode image will be described next with reference to FIG. 3. FIG. 3 is a diagram illustrating an example of an image that presents to a user the position and the orientation of the two-dimensional barcode image that are determined by the controller 60.

In FIG. 3, the two-dimensional barcode image is displayed at the center of a screen of the touch panel 11 and frames at a first position D1 to an eighth position D8 around the two-dimensional barcode image are presented to the user. Furthermore, the controller 60 further causes display of the two-dimensional barcode image oriented according to the determined orientation in the frame at any of the first position D1 to the eighth position D8. There are four options for the orientation of the two-dimensional barcode image: 0 degrees, 90 degrees, 180 degrees, and 270 degrees. There are 32 combinations of the orientation options and the position options of the frame. For example, the two-dimensional barcode image rotated clockwise by 90 degrees is displayed in the frame at the fourth position D4.

Figure 4:
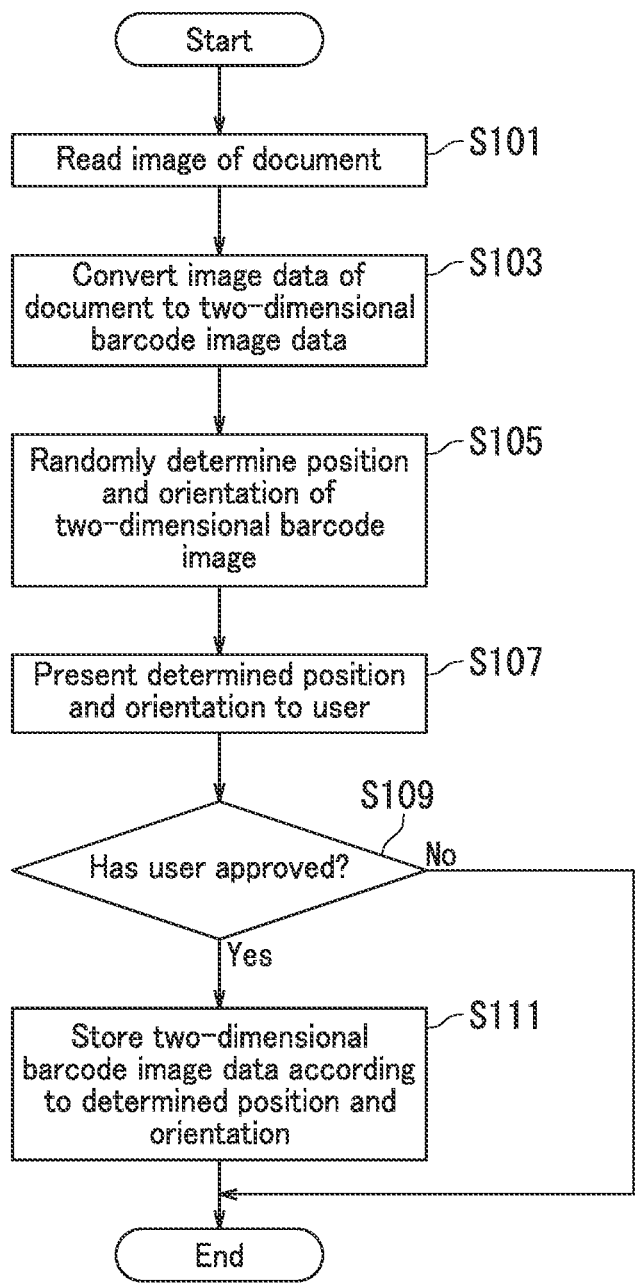
FIG. 4 is a flowchart depicting an example of an operation of the controller.

An operation of the controller 60 will be described next with reference to FIGS. 1 to 4. FIG. 4 is a flowchart depicting an example of the operation of the controller 60.

Step S101: The controller 60 controls the reading section 1 to read the image of the document G as depicted in FIG. 4. When the processing in Step S101 is completed, the procedure by the controller 60 proceeds to Step S103.

Step S103: The controller 60 converts the image data of the document G to the two-dimensional barcode image data 71. When the processing in Step S103 is completed, the procedure of the controller 60 proceeds to Step S105.

Step S105: The controller 60 randomly determines a position and an orientation of the two-dimensional barcode image from the 32 combinations. When the processing in Step S105 is completed, the procedure by the controller 60 proceeds to Step S107.

Step S107: The controller 60 causes presentation of the position and the orientation of the two-dimensional barcode image that are determined, as described in FIG. 3. When the processing in Step S107 is completed, the procedure by the controller 60 proceeds to Step S109.

Step S109: The controller 60 determines whether or not the user has approved the position and the orientation of the presented two-dimensional barcode image. If the controller 60 determines that the user has approved the position and the orientation (Yes in Step S109), the procedure by the controller 60 proceeds to Step S111. If the controller 60 determines that the user has not approved the position and the orientation (No in Step S109), the procedure by the controller 60 ends.

Step S111: The controller 60 stores to the storage 70 the two-dimensional barcode image data 71 according to the position and the orientation that are determined. The controller 60 may store to the storage 70 the two-dimensional barcode image data 71 that reflects the position and the orientation that are determined. Alternatively, the controller 60 may store to the storage 70 the information indicating the position and the orientation that are determined separate from the two-dimensional barcode image data 71. When the processing in Step S111 is completed, the procedure by the controller 60 ends.

Figure 5:
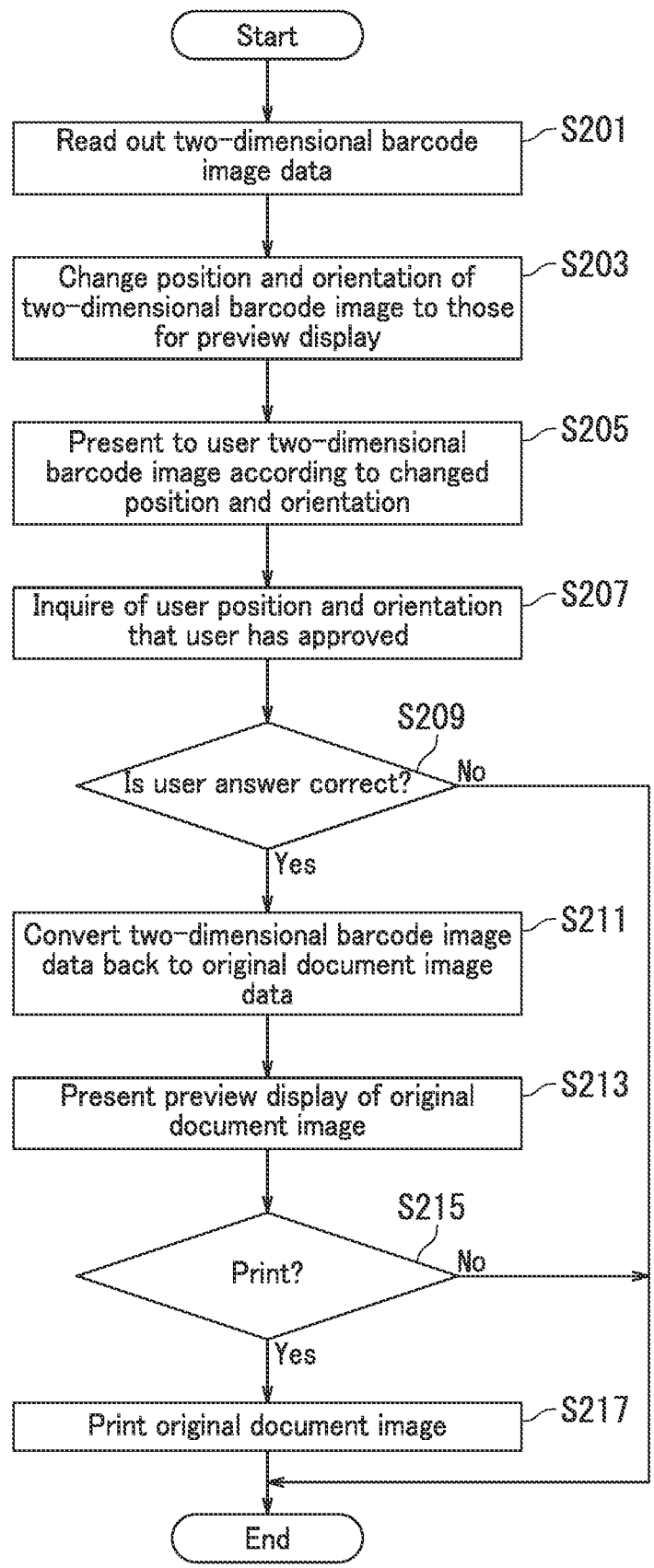
FIG. 5 is a flowchart depicting an example of the operation of the controller.

The operation of the controller 60 will be further described next with reference to FIGS. 1 to 5. FIG. 5 is a flowchart depicting an example of the operation of the controller 60.

Step S201: Upon request from the user, the controller 60 reads out the two-dimensional barcode image data 71 from the storage 70 as depicted in FIG. 5. When the processing in Step S201 is completed, the procedure by the controller 60 proceeds to Step S203.

Step S203: The controller 60 changes the position and the orientation of the two-dimensional barcode image to those for preview display. That is, the position and the orientation of the two-dimensional barcode image presented to the user in preview display are fixed to the central position and a rotational angle of 0 degrees, respectively, in the screen illustrated in FIG. 3 regardless of the position and the orientation that are determined in Step S105. When the processing in Step S203 is completed, the procedure by the controller 60 proceeds to Step S205.

Step S205: The controller 60 causes the touch panel 11 to present to the user the two-dimensional barcode image according to the position and the orientation that have been changed in Step S203. That is, only a sign that identifies a position of a frame is displayed in the frame at each of the first position D1 to the eighth position D8 in FIG. 3. When the processing in Step S205 is completed, the procedure by the controller 60 proceeds to Step S207.

Step S207: The controller 60 inquires of the user the position and the orientation that the user has previously approved. When the processing in Step S207 is completed, the procedure by the controller 60 proceeds to Step S209.

Step S209: The controller 60 determines whether or not a user answer received through the touch panel 11 is correct. If the controller 60 determines that the user answer is correct (Yes at Step S209), the procedure by the controller 60 proceeds to Step S211. If the controller 60 determines that the user answer is not correct (No in Step S209), the processing of the controller 60 ends.

Step S211: The controller 60 converts the two-dimensional barcode image data 71 back to the original document image data. When the processing in Step S211 is completed, the procedure by the controller 60 proceeds to Step S213.

Step S213: The controller 60 causes the touch panel 11 to display the original document image. When the processing in Step S213 is completed, the procedure by the controller 60 proceeds to Step S215.

Step S215: The controller 60 determines whether or not a printing request has been received from the user through the touch panel 11. If the controller 60 determines that the printing request has been received (Yes at Step S215), the procedure by the controller 60 proceeds to Step S217. If the controller 60 determines that the printing request has not been received (No in Step S215), the procedure by the controller 60 ends.

Step S217: The controller 60 controls the image forming section 4 to print the original document image. When the processing in Step S217 is completed, the procedure by the controller 60 ends.

According to the above embodiment, through use of the information on the position and the orientation of the two-dimensional barcode image as security requirements, an image forming apparatus 100 can be provided that can easily establish a security measure.

In particular, the controller 60 in the present embodiment causes the touch panel 11 to present to the user information on a position and an orientation of the two-dimensional barcode image, and stores the two-dimensional barcode image data 71 to the storage 70 only upon receipt of user approval.

Furthermore, the controller 60 in the present embodiment converts the two-dimensional barcode image data 71 back to the document image data for preview display of the document image only when the user gives a correct answer about the information on the position and the orientation of the two-dimensional barcode image.

In addition, the controller 60 in the present embodiment performs control that allows image formation by the image forming section 4 for the image of the document G as a target for image formation only when preview display has been successfully done.

An embodiment of the present disclosure has been described so far with reference to the drawings. However, the present disclosure is not limited to the above embodiment and can be practiced in various manners within a scope not departing from the gist of the present disclosure. Also, formation of various disclosures is possible by appropriately combining elements of configurations disclosed in the above embodiment. For example, some of all the elements of configuration indicated in the embodiment may be omitted. The drawings schematically illustrate elements of configuration in order to facilitate understanding. The numbers and the like of the elements of configuration illustrated in the drawings may differ from reality in order to facilitate preparation of the drawings. Also, the elements of configuration indicated in the above embodiment are merely examples and not intended as specific limitations. Various alterations may be made within a scope not substantially departing from the effects of the present disclosure.

The image forming apparatus 100 is an electrographic image forming apparatus in the embodiment. However, the present disclosure is not limited to the above. The image forming apparatus 100 may be an inkjet image forming apparatus, for example.

What is claimed is:

1. An image forming apparatus comprising:
   an image forming section configured to form an image on a recording medium;
   an operation section including a touch panel;
   storage that stores image data therein; and
   a controller configured to control the image forming section, the operation section, and the storage, wherein the controller:
   converts document image data to two-dimensional barcode image data;
   randomly determines a position and an orientation of a two-dimensional barcode image to be located in a document image;
   stores to the storage the two-dimensional barcode image data together with information on the position and the orientation that are determined by the controller, and
   causes, only when a correct answer about the information on the position and the orientation is received from a user through the touch panel, preview display of the document image through converting the two-dimensional barcode image data back to the document image data.

2. The image forming apparatus according to claim 1, wherein
   the controller causes the touch panel to present the information on the position and the orientation to the user, and
   only upon receipt of user approval, the controller stores the two-dimensional barcode image data to the storage.

3. The image forming apparatus according to claim 1, wherein
   only when the preview display of the document image has been successfully done, the controller performs control that allows image formation by the image forming section for the document image as a target for the image formation.

4. The image forming apparatus according to claim 1, further comprising
   a reading section configured to read the document image, wherein
   the controller receives the document image data from the reading section.

* * * * *